United States Patent [19]

Baltschun

[11] 4,172,415

[45] Oct. 30, 1979

[54] DEVICE FOR PROTECTION OF A SET OF TOOLS IN A HYDRAULIC PRESS

[75] Inventor: Horst Baltschun, Rülzheim, Fed. Rep. of Germany

[73] Assignee: SMG Suddeutsche Maschinenbau-Gesellschaft mbH, Fed. Rep. of Germany

[21] Appl. No.: 912,419

[22] Filed: Jun. 5, 1978

[30] Foreign Application Priority Data

Jun. 10, 1977 [DE] Fed. Rep. of Germany ....... 2726201

[51] Int. Cl.[2] ............................ B30B 1/08; F16P 7/00

[52] U.S. Cl. ......................................... 100/53; 83/61; 192/129 A

[58] Field of Search ................. 100/53; 83/61, 62, 58, 83/554; 425/154; 192/129 A

[56] References Cited

U.S. PATENT DOCUMENTS

| | | | |
|---|---|---|---|
| 3,310,841 | 3/1967 | Hehl | 425/154 |
| 3,440,909 | 4/1969 | Schmid | 83/61 |
| 3,568,553 | 3/1971 | Wanner | 100/53 |
| 3,979,980 | 9/1976 | Biester | 83/61 |
| 3,991,639 | 11/1976 | Pfeifer | 83/61 |

*Primary Examiner*—Billy J. Wilhite

*Attorney, Agent, or Firm*—Craig and Antonelli

[57] ABSTRACT

A protection arrangement for a tool set in a hydraulic press in which press, a press ram can be moved by at least one rapid- or fast-stroke cylinder piston unit and at least one working stroke pressure unit in a working stroke direction. The protection arrangement protects the tools from an overloading by a foreign object or body situated in the tool space and includes a displacement or path switch monitoring a portion of the path of movement of the ram and a further switching element which responds during movement of the press ram, as well as a control circuit for evaluating the sequence of response of the displacement or path switch and the switching element in such a way that a fault signal is produced if the switching element responds before the path or displacement switch. The path or displacement switch responds when the tool moved by the press ram has come to a distance or almost to a distance from the other tool which corresponds to a previously given thickness of the workpiece with the switching element being constructed as a signal transmitter which is responsive to a retardation or increase in resistance in the movement of the press ram in the working stroke direction.

8 Claims, 4 Drawing Figures

DEVICE FOR PROTECTION OF A SET OF TOOLS IN A HYDRAULIC PRESS

The present invention relates to a protection arrangement and, more particularly, to an arrangement for the protection of a set of tools in a hydraulic press against overloading if an object or foreign body is situated in a tool space of the hydraulic press.

In U.S. Pat. No. 3,991,639 and Swiss Pat. No. 579,981, a tool protection arrangement is proposed wherein a control member is provided which responds to a movement of a press ram. The control member is constructed as a travel or path switch which is responsive to a relative movement between two components of the press with respect to one another. The travel or path switch is arranged in such a way that relative movements between a movable driven piston of at least one high-speed or rapid-stroke cylinder piston unit and the press ram is sensed. For the purpose of sensing the relative movement between the piston rod of the piston of the at least one high-speed or rapid-stroke cylinder piston unit and the press ram, the piston rod carries at an end opposite the piston of the high-speed or rapid-stroke cylinder piston unit a sensing piston which is movably guided in a sensing cylinder in the press ram subjected to a pressure medium. A sensing gap is formed between the press ram and a collar on the piston rod with the compression of the sensing gap being indicated by the travel or path switch. As a result of the adjustment of the pressure of the pressure medium supplied to the sensing cylinder to a suitable value, the proposed tool protection arrangement operates so that the sensing gap remains open so long as the at least one high-speed or rapid-stroke cylinder piston unit moves the press ram in the work stroke direction without having to overcome a resistance to movement which exceeds the normal value during an idle stroke. When the sensing gap is closed, the travel or path switch responds as soon as a resistance to movement of the press ram exceeds the normal value during an idle stroke.

By virtue of the interposition of the sensing piston movable relative to the press ram, there may occur some reduced precision in a guidance of the tool fixed to the press ram. Moreover, some difficulties may be encountered in effecting control when an object is present in the tool space since the retardation of the press ram with the tool fixed thereto, which is caused by the object or foreign body and which corresponds to an acceleration of the press ram with the tool affixed in relation to the continued movement of the piston rod of the at least one high-speed or rapid-stroke cylinder piston unit, must first be converted into a detectable relative movement, that is, the closing of the sensing gap between the press ram and the piston rod, before the travel or path switch can respond. Furthermore, due to the considerable masses involved in hydraulic press structures, some delays may be experienced in the response of the travel or path switch. Additionally, in spite of the presence of a foreign body or object in the tool space, considerable forces may act upon the tools.

In Swiss Pat. No. 490,963, British Pat. No. 1,248,092 and Offenlegungsschrift 1,921,583, a tool protection device is proposed wherein a switching element, responsive to a movement of a press ram, is in the form of a displacement switch, that is, a switch responsive to a relative movement of two parts of a press with respect to one another. In this proposed device, the additional displacement switch is so disposed that it scans relative movements between the driven press ram and a tool carrier plate which precedes the press ram in a direction of the working stroke. The tool carrier plate is guided for relative movement and is usually referred to as a "scanning table." A disadvantage of this latter proposed protection arrangement resides in the fact that there is a reduction in the accuracy of the guidance of a tool fastened on the tool carrier plate, which guidance is based on the interposition of the tool carrier plate which is movable relative to the press ram.

In commonly assigned U.S. patent application Ser. No. 854,642, a tool protection arrangement for tools of a hydraulic press is proposed wherein a displacement switch means is provided for monitoring a portion of a movement path of a press ram and for providing an output signal indicative of such movement with a further switching means being provided which responds or provides an output signal of the press ram movement. A control circuit means is operatively connected to both switching means for evaluating a sequence of the output signals of the switching means in such a manner that a fault signal is formed in the event an output signal is received from the further switching means prior to an output signal from the displacement switch means. The further switching means may be in the form of a pressure limiting valve and/or a flow monitor, and the pressure limiting valve may be operatively connected with a hydraulically operated directional valve.

In commonly assigned U.S. patent application Ser. No. 888,749, a tool protection arrangement for tools of a hydraulic press is proposed wherein a displacement or travel switch monitors at least a portion of a path of movement of a press ram with a control member providing an output signal during a predetermined movement of the press ram. A control circuit evaluates a sequence of the output signals of the displacement or travel switch and a control member in such a way that a fault signal is formed when the additional switching device provides an output signal prior to an output signal of the displacement or travel switch. The control member is arranged in a path of force of at least one component of the hydraulic press and is constructed as a signal transducer operating virtually stationarily as a function of pressure.

The aim underlying the present invention essentially resides in providing a tool protection arrangement for hydraulic presses which shortens the delay of the response of the switching element.

According to advantageous features of the present invention, a press ram, movable in a work stroke direction by at least one fast-stroke or high-speed cylinder piston unit and at least one working stroke pressure unit, has its movements monitored by a travel or path switch over at least a portion of a work stroke with a further switching element responding during movement of the press ram in the work stroke direction, as well as a control circuit means for evaluating the sequence of the response of the path or travel switch and the switching element in such a way that, if the switching element responds before the path or travel switch, a fault signal is generated. The switching element is constructed as a signal transmitter which is dependent in its response upon a retardation of the movement of the press ram in the direction of the work stroke.

The travel or path switch, as with the proposed arrangements described hereinabove, is so arranged and adjusted so as to respond or provide an output signal when the tool moved by the press ram has moved toward the other tool until its distance from the other tool corresponds or substantially corresponds to a predetermined thickness of the workpiece which is to be processed. A fault signal, by which the continuation of the movement of the press ram in a working stroke direction is suppressed, can then be produced if there is present in the tool space an object or foreign body in the form of, for example, a second unprocessed workpiece of a predetermined thickness, a workpiece processed in a preceding work stroke, accrued waste material and/or other foreign bodies.

The generation of a fault signal may also take place if, before the position monitored by the displacement or travel switch is reached, the resistance of the press ram increases, for example, as a result of a fault in the guiding of the press ram to such an extent that an increase of resistance to movement by the press ram simulates the presence of an object in a tool space of the hydraulic press.

According to a particularly advantageous feature of the present invention, a direct detection of the delay in the movement of the press ram in the working stroke direction is accomplished by a signal transmitter in cases in which a fault signal has to be produced during a ram movement caused exclusively by the at least one high-speed or rapid-stroke cylinder piston unit. Because of the relatively high speed of the press ram movement which first exists in such cases, a signal transmitter can relatively easily pick-up or sense the retardation in the movement of the press ram. Moreover, due to the high-speed action of the high-speed or fast-stroke cylinder piston units, such units generally exhibit comparatively small effective pressure medium actuated surfaces so that only comparatively weak forces can act on the tools if an object or foreign body is present in the tool space of the hydraulic press.

According to the present invention, the signal transmitter can be constructed as an angular momentum transmitter which can be driven by a rack-and-pinion means with the rack being fixed to the press ram and extending in a working stroke direction. The angular momentum transmitter is connected to an evaluating circuit which evaluates the pulse sequence over a given period of time.

In accordance with yet another feature of the present invention, the signal transmitter may include a linear optical scale with uniform graduations fixed to the ram and extending in the working stroke direction with a photodiode cooperating with the scale and providing an output signal to an evaluating circuit for evaluating the pulse sequence.

According to yet another feature of the present invention, the signal transmitter may comprise an ohmic or capacitive variable linear resistor extending in the direction of the working stroke of the press ram with one part of the resistor being fixed to the ram and the other part thereof being fixed to the frame and with the evaluation circuit being connected to the output of the resistor so as to evaluate a change in resistance with respect to time.

Accordingly, it is an object of the present invention to provide a protection arrangement for working tools of hydraulic presses which avoids by simple means drawbacks and disadvantages encountered in the prior art.

Another object of the present invention resides in providing a protection arrangement for working tools of hydraulic presses wherein only comparatively weak forces can occur on the tools in the event a foreign body or other object is present in a tool space of the hydraulic press.

A further object of the present invention resides in providing a tool protection arrangement for working tools of a hydraulic press which functions reliably under all operating conditions.

An additional object of the present invention resides in providing a protection arrangement for working tools of hydraulic presses which minimizes the delay times for a switching element provided in the press construction.

Yet another object of the present invention resides in providing a protection arrangement for working tools of hydraulic presses which permits a direct detection of a delay in the movement of the press ram in a work stroke direction, which delay is occasioned by a foreign object present in the tool space and/or a fault in a guidance of the press ram.

These and other objects, features and advantages of the present invention will become more apparent from the following description when taken in connection with the accompanying drawings which show, for the purposes of illustration only, several embodiments in accordance with the present invention, and wherein.

Figure 1:
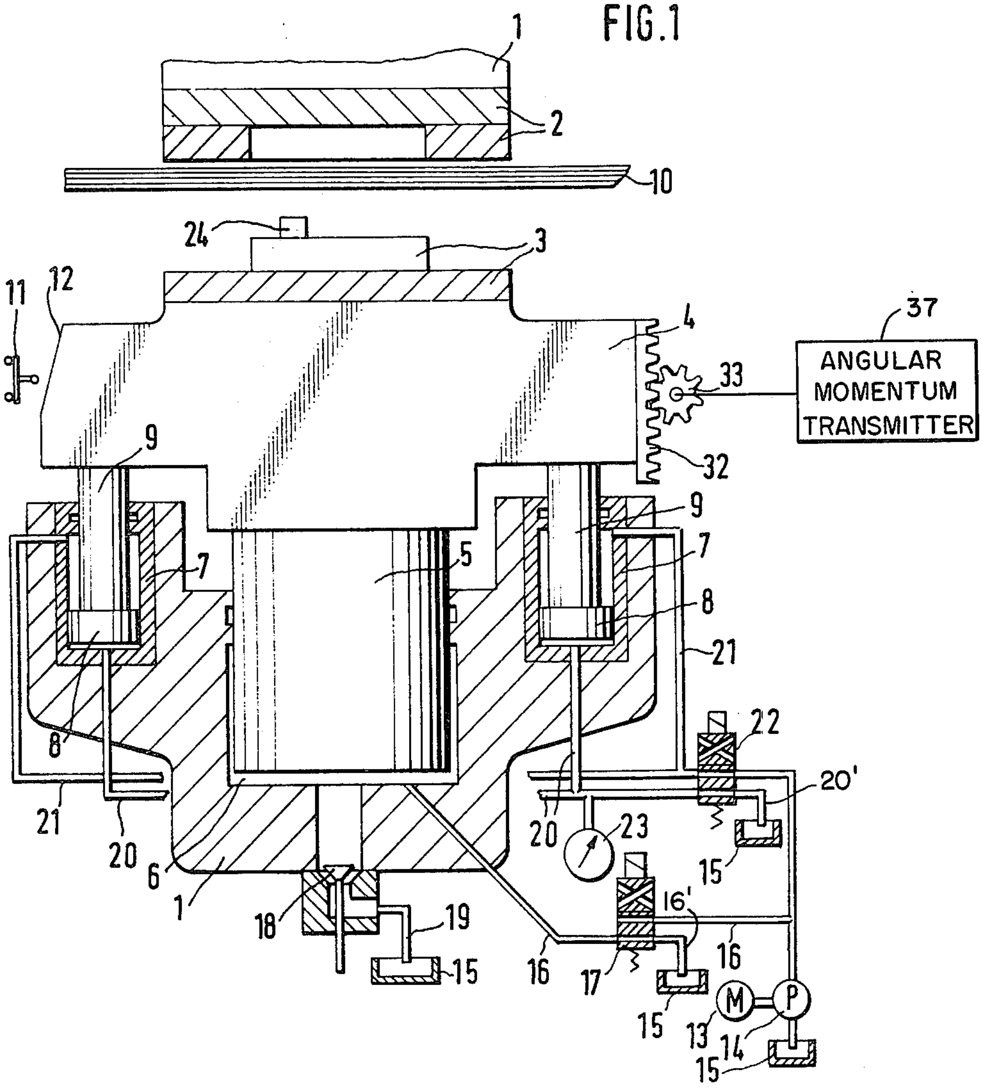
FIG. 1 is a cross-sectional, partially schematic view of a tool protection arrangement in accordance with the present invention arranged at a hydraulic press.

Referring now to the drawings wherein like reference numerals are used throughout the various views to designate like parts and, more particularly, to FIG. 1, an upper tool 2 of a tool set is fastened on an upper part of a frame 1 of a hydraulic press with a lower tool 3 of the tool set being fastened to a press ram 4 which is guided for vertical perpendicular movement in a lower part of the frame 1. The press ram 4 has a working stroke in an upward direction. Between the upper tool 2 and the lower tool 3 is disposed a strip or blank 10 of material from which a workpiece is to be punched or cut. The reference numeral 24 designates an object or foreign body arranged in the tool space of the hydraulic press which gives rise to a fault signal. The object or foreign body 24 rests upon the lower tool 3.

A working stroke pressure unit is provided which includes a plunger or piston 5 and a pressure medium space or chamber 6 disposed in a lower part of the frame 1 with the plunger 5 acting centrally on an underside or lower face of the press ram 4. On each side of the working stroke pressure unit is arranged a high-speed or rapid-stroke cylinder piston unit with each unit including a cylinder 7 disposed in the lower part of the frame 1 and piston 8. The high-speed or rapid-stroke cylinder piston units act by means of piston rods 9 on the underside or lower face of the press ram 4.

A displacement or travel switch 11 is mounted on the frame 1 so as to be adjustable in a direction of movement of the press ram 4. The displacement switch 11 is actuated or responds to a movement of the press ram 4 by a switch arm or the like contacting a control surface 12 on the press ram 4 when the press ram 4 has reached a position in which the lower tool 3 is at a distance from the upper tool 2 which corresponds or substantially corresponds to a thickness of the strip 10 of material.

Pressure medium required to operate or actuate the working stroke pressure unit and the high-speed or rapid-stroke cylinder piston units is drawn from a pressure medium source which includes a pressure medium reservoir 15 and a pump 14 driven by a motor 13 with the pressure medium being pumped into a pressure medium supply system which includes a number of pipes or pressure medium conduits 16, 20, 21.

A solenoid valve 17 is arranged in one of the pressure medium conduits or pipes 16 which connects the pressure medium space or chamber 6. The pressure medium chamber or space 6 is in communication with the pressure medium reservoir 15 through a one-way or non-return valve 18 and a suction pipe or conduit 19. The other pressure medium conduits or pipes 20, 21 establish communication with the upper and lower cylinder spaces in the cylinder 7 by way of an additional solenoid valve 22. A manometer or pressure gauge 23 is connected to the pressure medium conduit or pipe 20. Discharge pipes 20', 16' communicate with the solenoid valves 22, 17 so as to permit discharge of the pressure medium from the pressure spaces through the solenoid valves 22, 17 to the pressure medium reservoir 15.

As shown in FIG. 1, a toothed rack 32, fixed to the press ram 4, extends in the direction of the working stroke of the press ram 4. The rack 32 meshes with a pinion 33 with the shaft of the pinion 33 being mounted in the frame 1 and being in driving connection with a conventional angular momentum transmitter 37. The angular momentum transmitter 37 is connected with a logic circuit and provides an output signal to the logic circuit. The logic circuit evaluates the pulse sequence between the output signal of the displacement or path switch 11 and the transmitter 37 so as to provide a fault signal in the event a continuation of movement of the press ram 4 in the work stroke direction is prevented.

Figure 2:
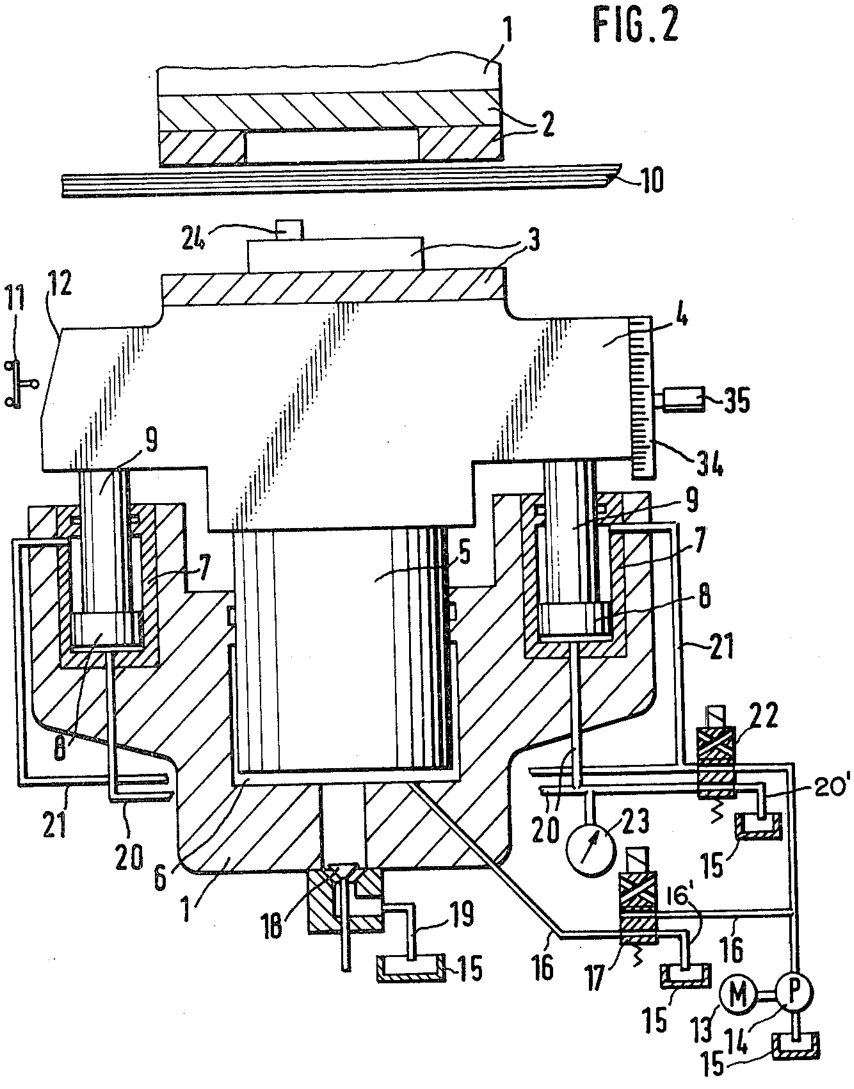
FIG. 2 is a cross-sectional, partially schematic view of a second embodiment of a tool protection arrangement in accordance with the present invention arranged at a hydraulic press.

As shown in FIG. 2, a linear optical scale 34 provided with uniform graduations is fixed to the press ram 4 and extends in the working stroke direction. A photodiode 35 is arranged opposite the optical scale 34 and cooperates therewith with the photodiode 35 being fitted to the frame 1. The photodiode 35 provides an appropriate output signal to a logic circuit which evaluates the output or pulse sequence of the displacement or path switch 11 and the photodiode 35 so as to provide a fault signal during a predetermined condition of the press.

Figure 3:
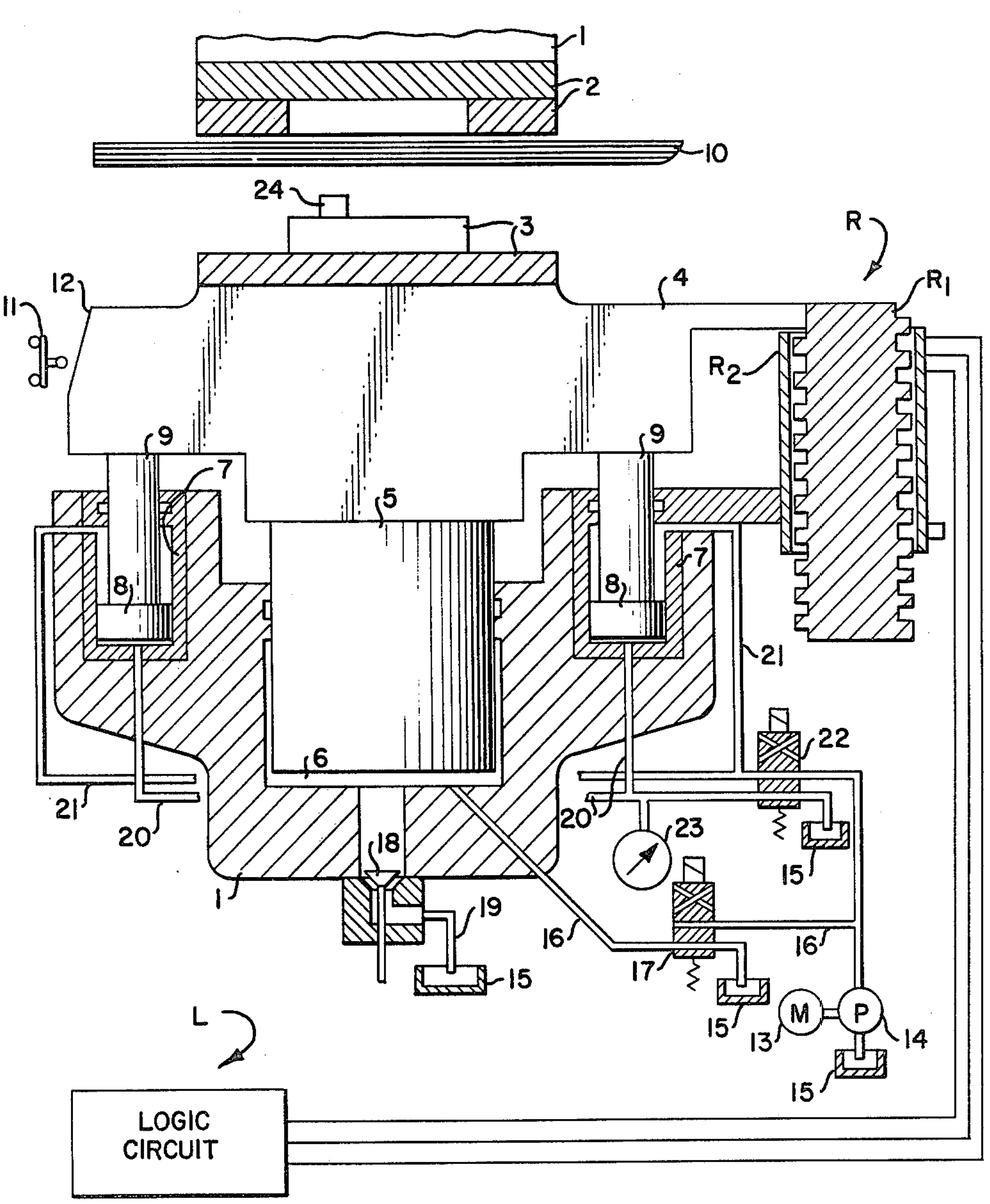
FIG. 3 is a cross-sectional, partially schematic view of a third embodiment of a tool protection arrangement in accordance with the present invention.

In lieu of an angular momentum transmitter 37 or linear optical transmitter 34, 35, as shown in FIG. 3, an ohmic or capacitive variable linear resistor generally designated by the reference character R may be utilized as a signal transmitter with a portion R1 of the linear resistor R being fixed to the press ram 4 and extending in the direction of the working stroke, with the other portion R2 of the resistor R being arranged at the frame 1. The ohmic or capacitive variable linear resistor R is connected to a logic circuit generally designated by the reference character L which evaluates a change in resistance with respect to time.

The angular momentum transmitter 37, the linear optical transmitter 34, 35 and the ohmic or capacitive variable linear resistor transmitter R are conventional in construction and may be of the type disclosed, for example, in U.S. Pat. Nos. 2,764,702; 2,769,969; 3,340,536; 3,353,098; 3,444,542; 3,796,950; 3,846,143; 3,886,473; 3,906,356; and 3,997,835; and Offenlegungsschrift No. 2,429,060.

Figure 4:
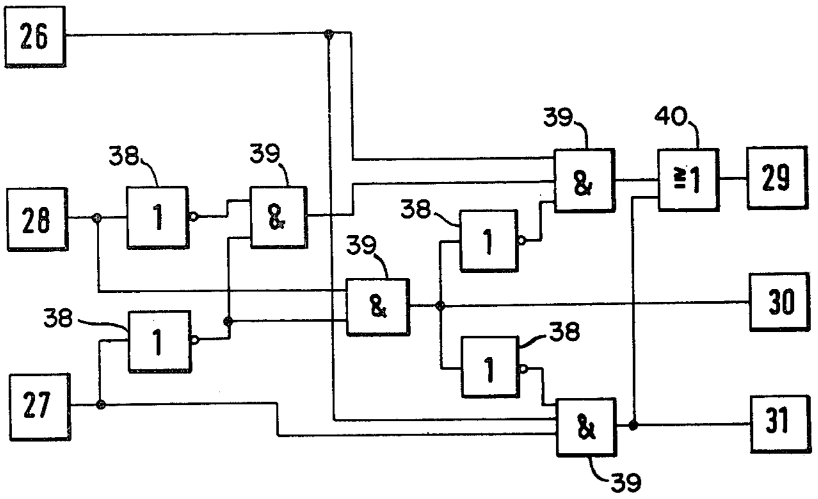
FIG. 4 is a logic control circuit for the tool protection arrangements in accordance with the present invention.

As shown in FIG. 4, a logic control circuit is provided which includes logic switching elements such as AND gates 39, OR gates 40 and inverters 38 interposed between signal inputs 26, 27, 28 and signal outputs 29, 30, 31.

In FIG. 4, the input signal 26 represents a command signal from an automatic press control arrangement or a signal from a pushbutton operating the hydraulic press with either signal being generated when the press ram 4 is to be operated or moved in a working stroke direction. The input signal 27 represents a response or output signal of the displacement or travel switch 11 with the input signal 28 representing a response or output signal from the angular momentum transmitter 37, linear optical transmitter, or ohmic or capacitive transmitter R. The output signal 29 controls the operation of the solenoid valve 22 for effecting a change-over or switching of the solenoid valve 22 from the position shown in FIGS. 1, 2 and 3. The output signal 30 controls the operation of the soleniod valve 22 for effecting a change-over or switching of the solenoid valve 22 from a displaced position to the position illustrated in FIGS. 1, 2 and 3. The output signal 31 energizes the solenoid valve 17 for effecting a change-over or switching of the solenoid valve 17 from the position shown in FIG. 1 to a displaced position.

Considering the logic circuit of FIG. 4, assuming that the input signals 26 and 27 are received by the logic circuit, output signals 29, 31 would displace the solenoid valves 17, 22 from the position shown in FIGS. 2 and 3 to permit pressure medium to flow from the reservoir 15 through the conduits 16, 20 to the lower pressure spaces of the work stroke pressure unit and the high-speed or fast-stroke cylinder piston units so that the press ram 4 is displaced in a working stroke direction. The displacement of the solenoid valve 22 also places the upper cylinder spaces of the high-speed or fast-stroke cylinder piston units in communication with the pressure medium reservoir 15.

If a foreign body or object 24 is located in the tool space and/or there is a fault in the guidance of the press ram 4, a retardation in the movement of the press ram 4 and/or an increase in the driving resistance will occur and such will be reflected by the output signals of the signal transmitters of the invention fed to the logic circuit. The output signals from the signal transmitters are evaluated in the logic circuit and generate a fault signal so that the solenoid valve 22 is displaced to the illustrated position, thereby communicating the lower pressure chambers of the high-speed or fast-stroke cylinder piston units with the pressure medium reservoir 15.

While I have shown and described several embodiments in accordance with the present invention, it is understood that the same is not limited thereto, but is susceptible of numerous changes and modifications as would be known to a person skilled in the art to which it pertains, and I therefor do not wish to be restricted to the details shown and described hereinabove, but intend to cover all such changes and modifications as are encompassed by the scope of the appended claims.

I claim:

1. An arrangement for protecting a set of tools in a hydraulic press against an overloading, the arrangement comprising a displacement switch means for monitoring at least a portion of a path of movement of a press ram in a working stroke direction and for providing an output signal indicative of a predetermined press ram movement, a switching means operatively associated with the press ram for providing an output signal indicative of a predetermined condition of the press ram, and a control circuit means operatively connected with said displacement switch means and said switching means for evaluating a sequence of the output signals of the displacement switch means and the switching means in such a manner that a fault signal is generated when the switching means provides an output signal prior to the output signal of the displacement switch means, characterized in that the switching means includes a signal transmitter which provides an output signal upon an occurrence of any delay in a movement of the press ram in a working stroke direction.

2. An arrangement according to claim 1, characterized in that the signal transmitter comprises an angular momentum transmitter, and means are operatively connected with the press ram for driving the angular momentum transmitter.

3. An arrangement according to claim 2, characterized in that the driving means includes a rack mounted on the press ram so as to extend in the working stroke direction, and a pinion meshing with said rack, said pinion including a pinion shaft in driving connection with the angular momentum transmitter.

4. An arrangement according to claim 1, characterized in that the signal transmitter comprises a photo-optical transmitter.

5. An arrangement according to claim 4, characterized in that the photo-optical transmitter includes a linear optical scale having uniform graduations arranged on the press ram and extending in the working stroke direction, and a photodiode means cooperable with said scale means for providing an output signal to the control circuit means.

6. An arrangement according to claim 1, characterized in that the signal transmitter comprises one of an ohmic or capacitive variable linear resistor transmitter.

7. An arrangement according to claim 6, characterized in that the ohmic or capacitive variable linear resistor includes a first part arranged on the press ram so as to extend in a working stroke direction, and a second part arranged at a frame of the press, and in that the control circuit includes an evaluation circuit for evaluating a change in resistance of a movement of the press ram with respect to time.

8. An arrangement according to claims 3, 5 or 7, characterized in that at least one fast-stroke cylinder piston means and at least one working stroke piston means are provided for causing a displacement of the press ram in a working stroke direction.

* * * * *